United States Patent
Wittenzellner et al.

(10) Patent No.: US 9,849,764 B2
(45) Date of Patent: Dec. 26, 2017

(54) CONVERTIBLE TOP CLOTH

(75) Inventors: Xaver Wittenzellner, Bischofsmais (DE); Alexander Reichelt, Hof (DE); Hans-Joachim Bammann, Deggendorf (DE); Erwin Blessberger, Moos (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 1402 days.

(21) Appl. No.: 12/311,009

(22) PCT Filed: Sep. 14, 2007

(86) PCT No.: PCT/DE2007/001645
§ 371 (c)(1),
(2), (4) Date: Jul. 27, 2009

(87) PCT Pub. No.: WO2008/031425
PCT Pub. Date: Mar. 20, 2008

(65) Prior Publication Data
US 2009/0286439 A1  Nov. 19, 2009

(30) Foreign Application Priority Data
Sep. 15, 2006 (DE) .......... 10 2006 044 234

(51) Int. Cl.
*B60J 7/12* (2006.01)
*B32B 5/18* (2006.01)

(52) U.S. Cl.
CPC .......... *B60J 7/1226* (2013.01); *B32B 5/18* (2013.01); *Y10T 442/25* (2015.04)

(58) Field of Classification Search
CPC .. B32B 5/18; B32B 5/20; B32B 5/245; B32B 27/12; B32B 27/065; B32B 27/16; B32B 27/34; B32B 27/36; Y10T 442/25; Y10T 442/647; Y10T 442/649; Y10T 442/651; B60J 7/1226
(Continued)

(56) References Cited

U.S. PATENT DOCUMENTS

| 4,964,668 | A | 10/1990 | Hofmann |
| 5,472,760 | A | 12/1995 | Norvell |
| 6,340,196 | B1 | 1/2002 | Windpassinger et al. |
| 6,340,197 | B1 | 1/2002 | Windpassinger |
| 6,528,437 | B1 | 3/2003 | Hepfinger et al. |

(Continued)

FOREIGN PATENT DOCUMENTS

| DE | 38 29 345 C2 | 3/1990 |
| DE | 92 06 366 U1 | 8/1992 |

(Continued)

OTHER PUBLICATIONS

International Preliminary Report on Patentability for International Application No. PCT/DE2007/001645, dated 2009.
(Continued)

*Primary Examiner* — Jennifer A Steele
(74) *Attorney, Agent, or Firm* — Davidson, Davidson & Kappel, LLC (57) ABSTRACT

The invention relates to a convertible top cloth, including an outer top cloth, an inner roof lining, an insulating layer which is arranged between the outer top cloth and the inner roof lining, and at least one absorbent film which is accommodated between the outer top cloth and the inner roof lining, is a plastic film produced at least from polyester and is provided on the insulating layer adjacent to the inner roof lining.

15 Claims, 9 Drawing Sheets

(58) Field of Classification Search
USPC .... 442/55–58, 120, 370, 394–399; 181/291; 296/107.01, 107.09; 428/36.1, 36.2, 36.5, 428/131–138, 474.4, 474.5, 480
See application file for complete search history.

(56) References Cited

U.S. PATENT DOCUMENTS

| | | | |
|---|---|---|---|
| 6,818,279 | B2 | 11/2004 | Schoenenback et al. |
| 6,871,898 | B2 * | 3/2005 | Jarrard et al. ........... 296/107.01 |
| 2003/0052510 | A1 * | 3/2003 | Schonenbach et al. . 296/107.09 |
| 2008/0185877 | A1 | 8/2008 | Sommer |

FOREIGN PATENT DOCUMENTS

| | | |
|---|---|---|
| DE | 694 06 098 T2 | 2/1998 |
| DE | 199 26 420 A1 | 12/2000 |
| DE | 199 49 878 A1 | 4/2001 |
| DE | 199 49 888 A1 | 4/2001 |
| DE | 100 31 007 A1 | 1/2002 |
| DE | 10 2005 006 033 A1 | 8/2006 |
| EP | 05 699 55 B1 | 9/1998 |
| EP | 1 285 800 A2 | 2/2003 |
| JP | 09109306 A | 4/1997 |

OTHER PUBLICATIONS

XP-002463359 (WPI 1997-293623 Abstract) (See also JP 09109306 A and computer translation thereof), 1997.
Printout of www.gaylord.com/adblock.asp?abid=2123 (accessed Oct. 4, 2011).
Printout of www.reemay.com/Reemay.cfm (accessed Oct. 4, 2011).

* cited by examiner

CONVERTIBLE TOP CLOTH

Priority is claimed to German Patent Application DE 10 2006 044 234.2-24 filed Sep. 15, 2006 through international application PCT/DE2007/001645, filed Sep. 14, 2007, the entire disclosures of which are hereby incorporated by reference herein.

This invention relates to a convertible top material and to a process for producing such a top material.

BACKGROUND

Foldable top materials are well known for folding tops of convertible vehicles. Such top materials are connected to the vehicle by means of a suitable articulated folding frame in order that the folding top may be moved between its open position and its closed position. The top material of state of the art vehicles is generally constructed in the form of a composite material which consists of two or more layers.

DE 199 49 878 A1 and DE 199 49 888 A1 each describe a convertible top material which comprises an outer top material and a casting resin layer which is attached to the outer top material on the vehicle interior side. According to DE 199 49 878 A1, top element side connecting elements are secured in the casting resin layer in order that connection to a top frame may be ensured. In the case of DE 199 49 888 A1, the casting resin layer serves as insulation, and also as stabilization against inflation. Here a thermally and acoustically insulating insulation layer, formed from a foamable plastic, is additionally provided between the casting resin layer and the outer top material.

DE 10 2005 006 033 A1 shows a top material in the form of a composite material for a foldable vehicle roof. This composite material comprises an underlayer, which faces the vehicle interior and is constructed, at least regionally, as a woven textile layer, a midlayer, and an outer leather layer, which are attached to the underlayer, in each case on a side remote from the vehicle interior. The outer leather layer is said to combine with the underlying layers to endow the top material with a longer life.

One of the intended functions of an insulation layer, usually made of a foamed plastic, in prior art top materials is that of providing acoustical insulation. However, such an insulation layer in the form of a foamed plastic is not ideal for acoustical insulation over a wide frequency range.

SUMMARY OF THE INVENTION

It is an object of the present invention to improve acoustical performance of a top material and its acoustical insulation.

We have found that this object is achieved by a convertible top material of the present invention and by a processof the present invention. A convertible top material according to the invention includes an outer top material, an inner roof liner, an insulation ply disposed between the outer top material and the inner roof liner, and at least one absorber film accommodated between the outer top material and the inner roof liner. The absorber film is a plastics film made of polyester at least and is attached to the insulation ply adjacent to the inner roof liner. This constitution and arrangement of the absorber film leads to effective acoustical insulation between the vehicle interior and the environment, as is documented by experimental tests.

The sound level of a noise decreases distinctly as it passes through the absorber film. The absorber film can be a robust membrane which is provided in a top material in addition to an outer top material and an insulation ply. The absorber film has good acoustical insulation in a direction essentially normal, i.e., perpendicular, to its surface. Integration of the absorber film as a sheetlike layer in the layered construction of the convertible top material significantly improves the acoustical performance of the convertible top material over its entire area.

The absorber film can consist of a plastics film made of polyester at least. Alternatively, the plastics film can be made of a mixture of polyester and nylon. The plastics film preferably has isotropic properties, which results in uniform acoustical insulation.

Advantageously, the absorber film may contain flame retardants and have a high melting point. Therefore, the absorber film is capable of withstanding even high temperatures, and the flame retardants prevent ignition and/or burning of the absorber film and hence of the top material. The absorber film is sufficiently elastic and hence bendable, allowing trouble-free folding of the convertible top material in the opened roof position.

In an advantageous development of the invention, at least one further absorber film may be attached to the insulation ply adjacent to the outer top material. The nature of the film, i.e., its structure and material can have an effect on the degree of acoustical insulation. It has been determined that when the absorber film is attached to the inner roof liner side of the convertible top material, the sound absorption is greater.

One advantage of the invention is that the absorber film is provided separately from the insulation ply and is only attached to the ready-foamed insulation ply, i.e., after the insulation ply has been produced as such, for example after the foaming of a plastic.

In an advantageous development of the invention, the absorber film may be attached on both sides of the insulation ply, on one side adjacent to the outer top material and on the other side adjacent to the inner roof liner. The both-sided attachment of the absorber film results in a sustained improvement in the acoustical insulation for the convertible top material. Since the absorber film has a thin cross section, i.e., is very flat, the resulting overall thickness of the convertible top material is not significantly increased when an absorber film is provided on both sides of the insulation ply.

In a further development of the invention, the absorber film may be secured to the insulation ply by adhesive bonding or hot pressing. These processing steps can be carried out within a short time and, more particularly, automatedly. Alternatively, the absorber film may be secured to the insulation ply by in situ foaming. This results in a material lock between the insulation ply and the absorber film whereby unassisted detachment of the absorber film from the insulation ply is not possible even after a prolonged period.

In an advantageous development of the invention, the insulation ply may consist of a nonwoven and/or a foam mat. Such materials already have acoustically insulating properties, so that the acoustical insulation resulting for the convertible top material is improved in conjunction with the above-elucidated absorber film.

In an advantageous development of the invention, a fabric backing may be provided between the outer top material and the inner roof liner. Such a fabric backing may consist of a knitted polyester material, which is inexpensive and has excellent folding properties. Advantageously, the insulation ply is foamed onto the fabric backing, so that the fabric backing forms a supporting layer for the insulation ply. The fabric backing may be disposed in the construction of the convertible top material either adjacent to the outer top material or adjacent to the inner roof liner.

In an advantageous development of the invention, the inner roof liner is secured, on the vehicle interior side, to the absorber film or, if appropriate, directly to the insulation ply. The inner roof liner may also be formed directly on a side of the absorber film which faces the vehicle interior, obviating a separate layer for an inner roof liner.

The process according to the invention for producing a convertible top material includes the steps of providing an outer top material and an insulation ply, providing at least one absorber film, connecting the absorber film to the insulation ply on the side which is adjacent to a vehicle interior, and connecting the outer top material to the insulation ply.

One significant advantage of the process according to the invention is that the insulation ply is already produced as such before the separate absorber film is connected thereto. There is therefore no need to take account of any (in) compatibility between the absorber film and the insulation ply with regard to possible foaming of a plastic. As explained, the absorber film is only subsequently connected to the insulation ply, for example by means of adhesive bonding or hot pressing on the insulation ply or by means of in situ foaming into the insulation ply.

It will be understood that the hereinabove recited and the hereinbelow still to be elucidated features are usable not only in the particular combination indicated, but also in other combinations or alone, without departure from the realm of the present invention.

BRIEF DESCRIPTION OF THE DRAWINGS

The invention is hereinbelow schematically described based on several embodiments depicted in the drawing and is more particularly described with reference to the drawing.

DETAILED DESCRIPTION OF THE DRAWINGS

FIGS. 1 to 6 each show various embodiments of an inventive convertible top material 1 in a cross-sectional view. Like elements bear like reference signs and, to avoid repetition, are only elucidated once. It will be understood that the top material 1 has the hereinbelow elucidated construction for its cross section in its entire areal extent.

Figure 1:
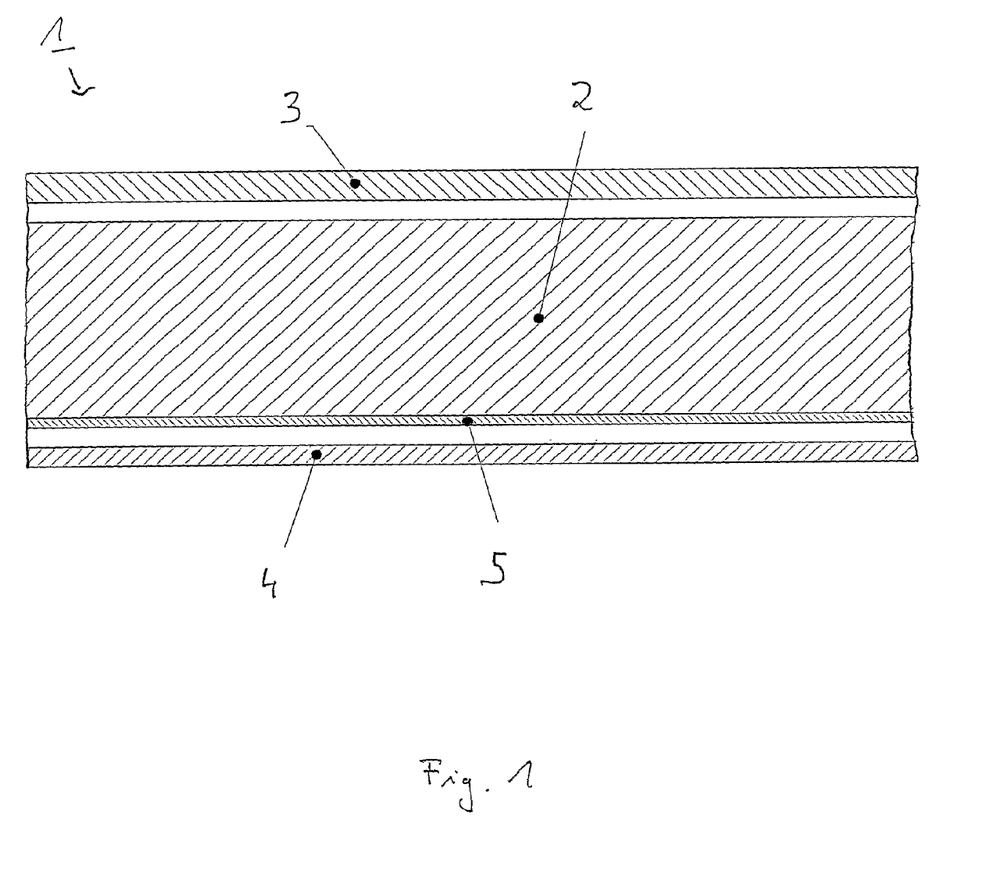
FIG. 1 shows a cross-sectional view of an top material according to the invention.

In accordance with the depiction in FIG. 1, the top material 1 includes in its central region an insulation ply 2 to which is secured, in the direction of the vehicle exterior, an outer top material 3. The outer top material 3 is substantially watertight and weathering resistant, so that ingress of water from an outside surface of the top material 1 into an interior of a vehicle is not possible. On an opposite side of the insulation ply 2, i.e., facing an interior of the vehicle, is disposed an inner roof liner 4. Between the inner roof liner 4 and the outer top material 3 is provided an absorber film 5 which is suitably secured to the insulation ply 2.

FIG. 1 shows the above-elucidated elements 2 to 5 in the manner of an exploded view wherein the outer top material 3 and the inner roof liner 4 have no direct contact with the insulation ply 2 and the absorber film 5, respectively. With regard to the absorber film 5 and the inner roof liner 4, this depiction corresponds to the actual construction of the top material. The inner roof liner 4 is connected via ligaments, strips and fastening straps, which are partially secured to the inner roof liner 4, to a top frame or system of struts. There can thus be an air gap between the inner roof liner and the absorber film which is secured to the insulation ply 2. Alternatively, in departure from the depiction in FIG. 1, however, the inner roof liner 4 can also be secured directly on the absorber film 5 without a resulting air gap in-between.

With regard to the connection between the insulation ply 2 and the outer top material 3, however, FIG. 1 constitutes a simplified depiction, since these two layers are actually in contact with each other and no air gap has been formed in-between.

The absorber film 5 includes a plastics film which consists of a nylonpolyester blend and has isotropic properties. The absorber film 5 has excellent sound-absorption properties in a direction essentially perpendicular to its surface. Owing to the absorber film 5, the acoustical insulation properties of the top material 1 are significantly improved compared with conventional top materials, which is reflected in an increased level difference on both sides of the top material 1. Details thereof are hereinbelow additionally elucidated with reference to FIGS. 7 and 8.

Figure 9:
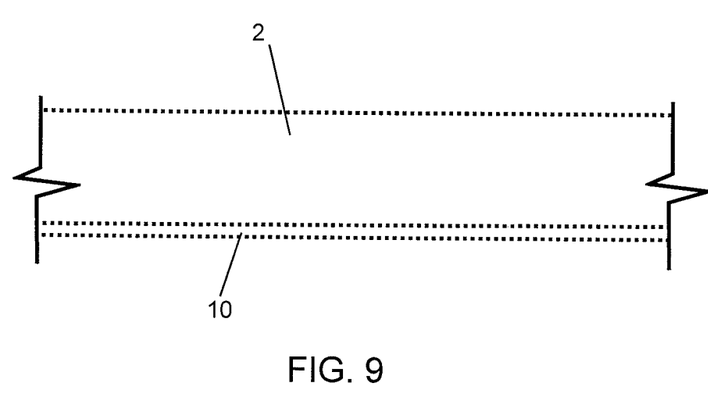

The insulation ply 2 consists of a foamed polyurethane which has an open-cell structure. The insulation ply 2 can be made for example of elastogran material, which can be obtained from BASF. The insulation ply 2 is foamed in a known manner onto a supporting layer 10, as shown schematically in FIG. 9, so that it is further processible after full reaction of the polyurethane.

The absorber film 5 is adhesively bonded to the insulation ply 2 on the side facing a vehicle interior. Alternatively, the absorber film 5 can also be connected to the insulation ply by hot pressing, or else be in situ foamed into the insulation ply 2. Finally, the inner roof liner 4 is secured, for example by adhesive bonding, to a side of the absorber film 5 which is opposite the insulation ply 2.

In the production of the inventive top material 1 it is important that the insulation ply 2 is produced separately from the absorber film 5 except in the case where the absorber film 5 is directly foamed in situ into the insulation ply 2. It is only after the insulation ply 2 is ready produced that the absorber film 5 is applied to the insulation ply 2, for example by adhesive bonding.

Although not discernible in FIG. 1, the inner roof liner 4 can be formed not as a separate ply to be applied to the absorber film 5, but also directly on the absorber film 5, for example in the form of a flocking or the like. In this way, a separate layer in the form of the inner roof liner is dispensed with, so that there is no danger of delamination of the inner roof liner 4 from the absorber film 5.

Figure 2:
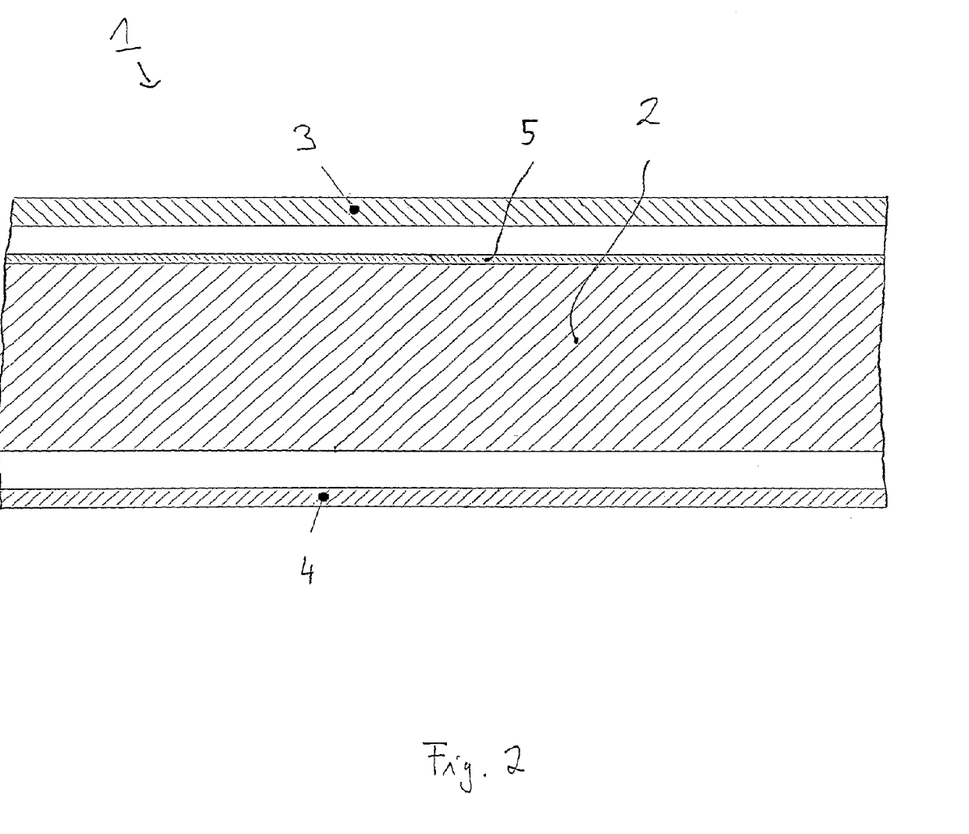
FIG. 2 shows a cross-sectional view of a further embodiment of the top material according to the invention.

FIG. 2 shows a cross-sectional view of the inventive top material 1 in a further embodiment. Here the absorber film 5 is provided between the insulation ply 2 and the outer top material 3, and it is the inner roof liner 4 which is now directly secured to a side of the insulation ply 2 which faces the direction of the vehicle interior. It will be understood that the embodiment as per FIG. 2 has similar properties with regard to acoustical insulation to those of FIG. 1.

Figure 3:
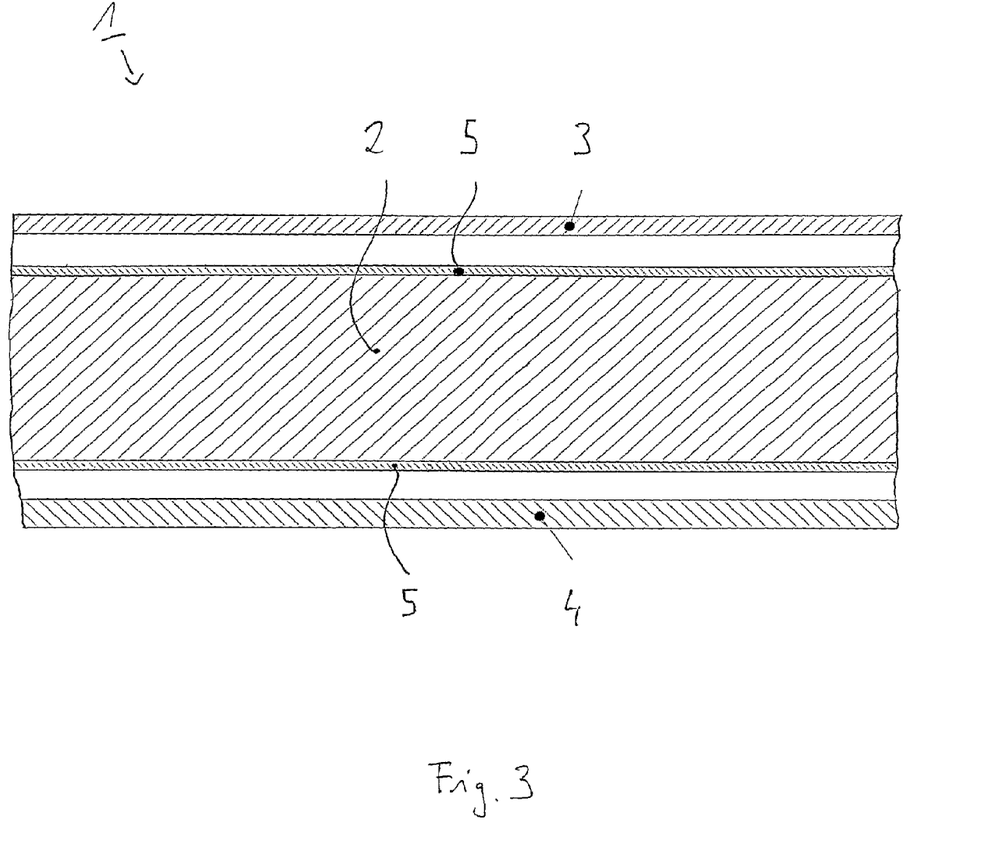
FIG. 3 shows a cross-sectional view of a further embodiment of the top material according to the invention.

FIG. 3 shows a cross-sectional view of the top material 1 in a further embodiment wherein the absorber film 5 is provided on both sides of the insulation ply 2. Thus, the two sides of the insulation ply 2 each have an absorber film 5 secured thereto. Correspondingly, the outer top material 3 and the inner roof liner are each secured to the absorber film 5. The embodiment as per FIG. 3 accordingly includes a doubled ply with regard to the absorber film 5, with correspondingly improved properties in acoustical insulation.

Figure 4:
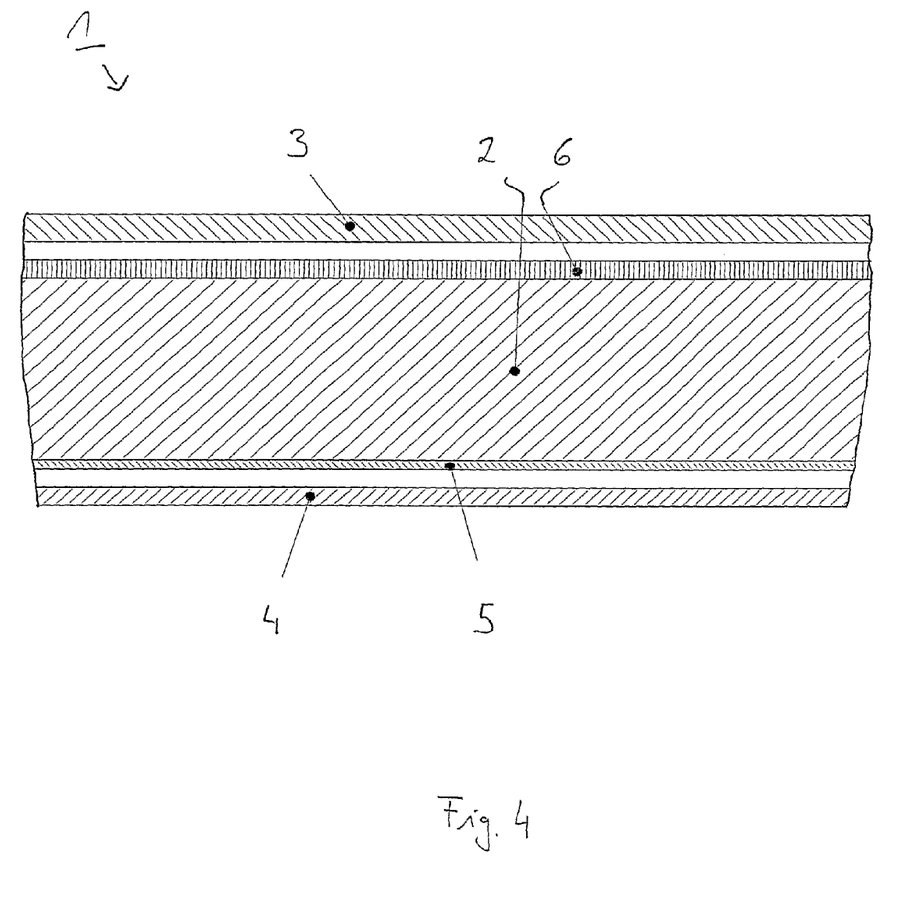
FIG. 4 shows a cross-sectional view of a further embodiment of the top material according to the invention.

FIG. 4 shows a cross-sectional view of the top material 1 in a further embodiment similar to that of FIG. 1. The difference is that a fabric backing 6, which consists of a knitted polyester material, is additionally provided between the insulation ply 2 and the outer top material 3. The fabric backing 6 conveniently serves as supporting film onto which the insulation ply 2 is foamed. As elucidated above, the foaming of the insulation ply 2 takes place before any securing of the absorber film 5.

Figure 5:
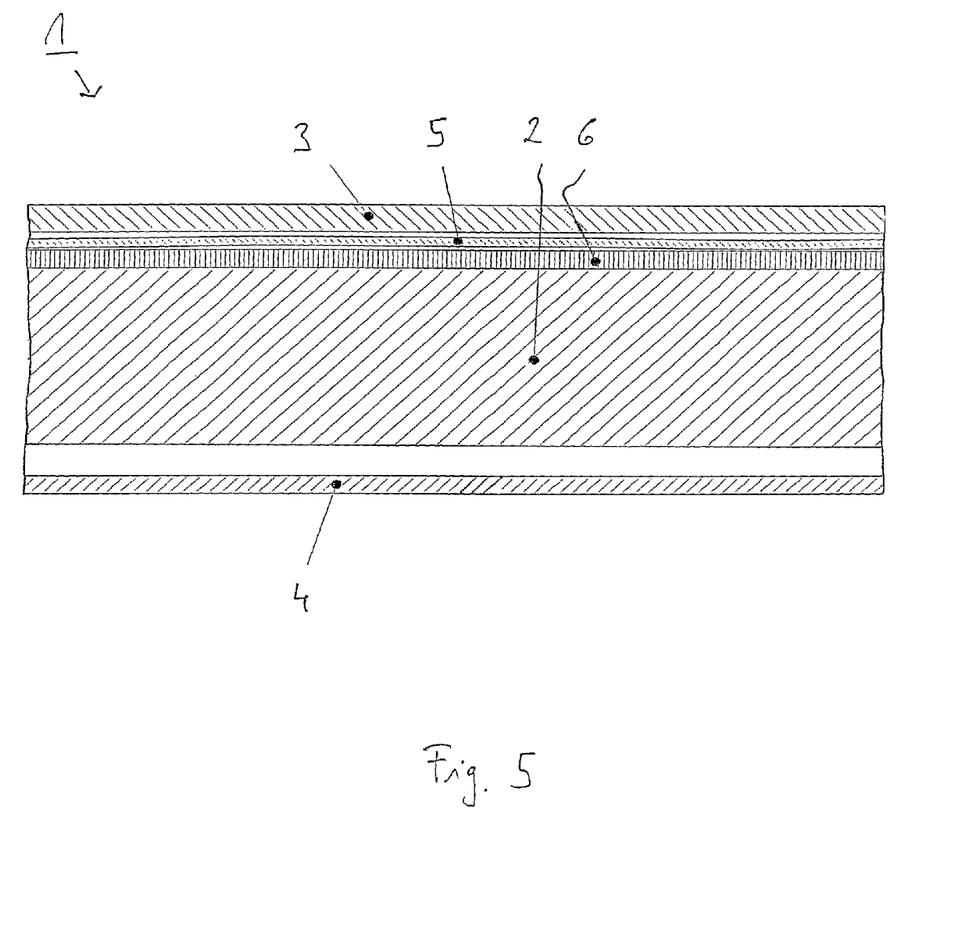
FIG. 5 shows a cross-sectional view of a further embodiment of the top material according to the invention.

FIG. 5 shows a cross-sectional view of the top material 1 in a further embodiment similar to that of FIG. 4. The difference is now that the absorber film 5 is provided between the fabric backing 6 and the outer top material 3 and not on that side of the insulation ply 2 which faces the vehicle interior. This arrangement can be brought about by adhesively bonding the absorber film 5 to the fabric backing 6 after the insulation ply 2 has been foamed onto the latter and subsequently connecting the outer top material 3 to the absorber film 5, for example by adhesive bonding. The inner roof liner 4 is directly connected to the insulation ply 2 on that side of the latter which faces the vehicle interior.

Figure 6:
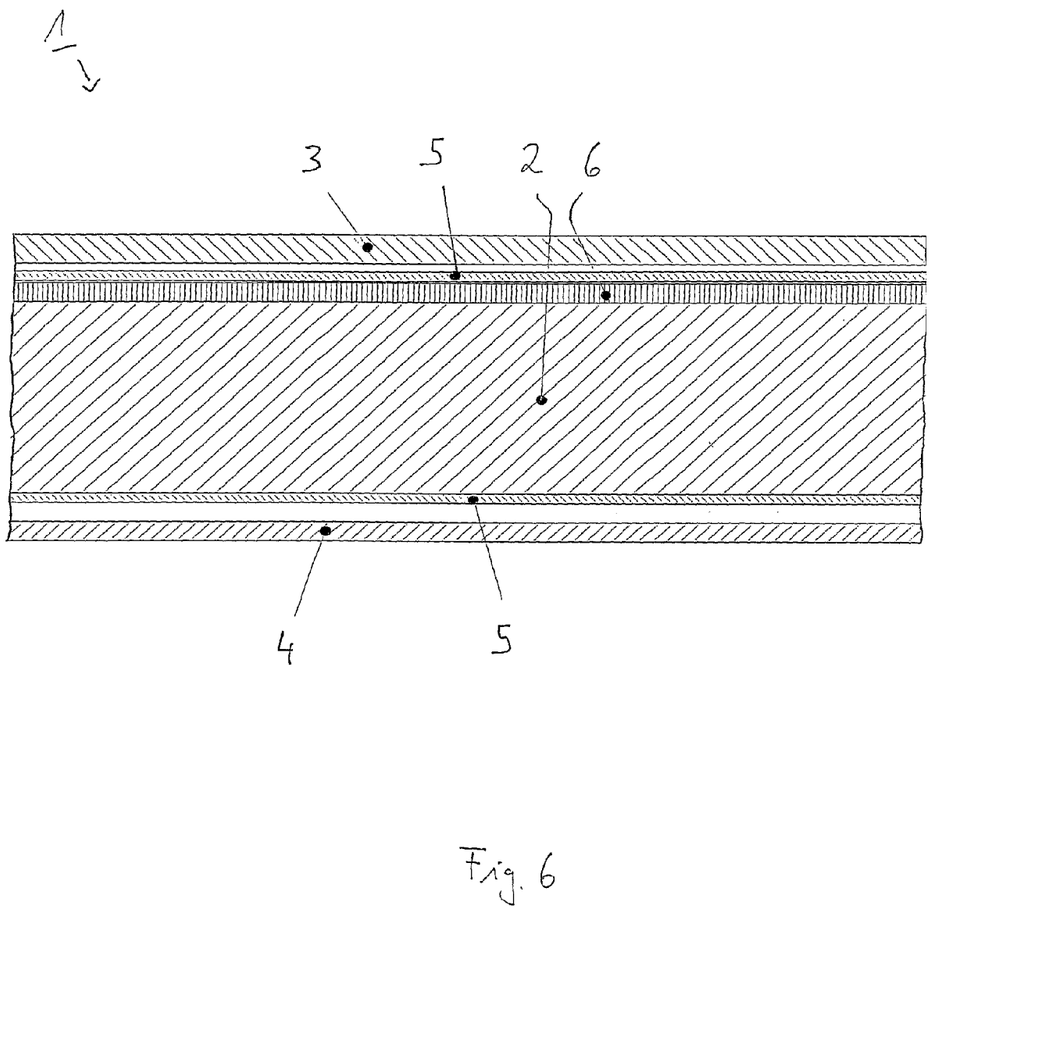
FIG. 6 shows a cross-sectional view of a further embodiment of the top material according to the invention.

FIG. 6 shows a cross-sectional view of the top material 1 in a further embodiment similar to that of FIG. 5. The difference is that the absorber film 5 is provided on both sides of the insulation ply 2, i.e., adhesively bonded directly on the insulation ply 2 on that side which faces the vehicle interior, and adhesively bonded to the fabric backing 6 on the side which is opposite to the vehicle interior. Similarly to the embodiment of FIG. 3, the embodiment of FIG. 6 has further improved properties with regard to acoustical insulation owing to the doubled ply of absorber film 5.

It will be understood with regard to all the aforementioned embodiments that there may be an air gap between the inner roof liner 4 and the layer thereabove, i.e., the insulation ply 2 or the absorber film 5. Alternatively, direct securement of the inner roof liner 4 to the superior layer of the convertible top material is also possible without such an air gap.

Figure 7:
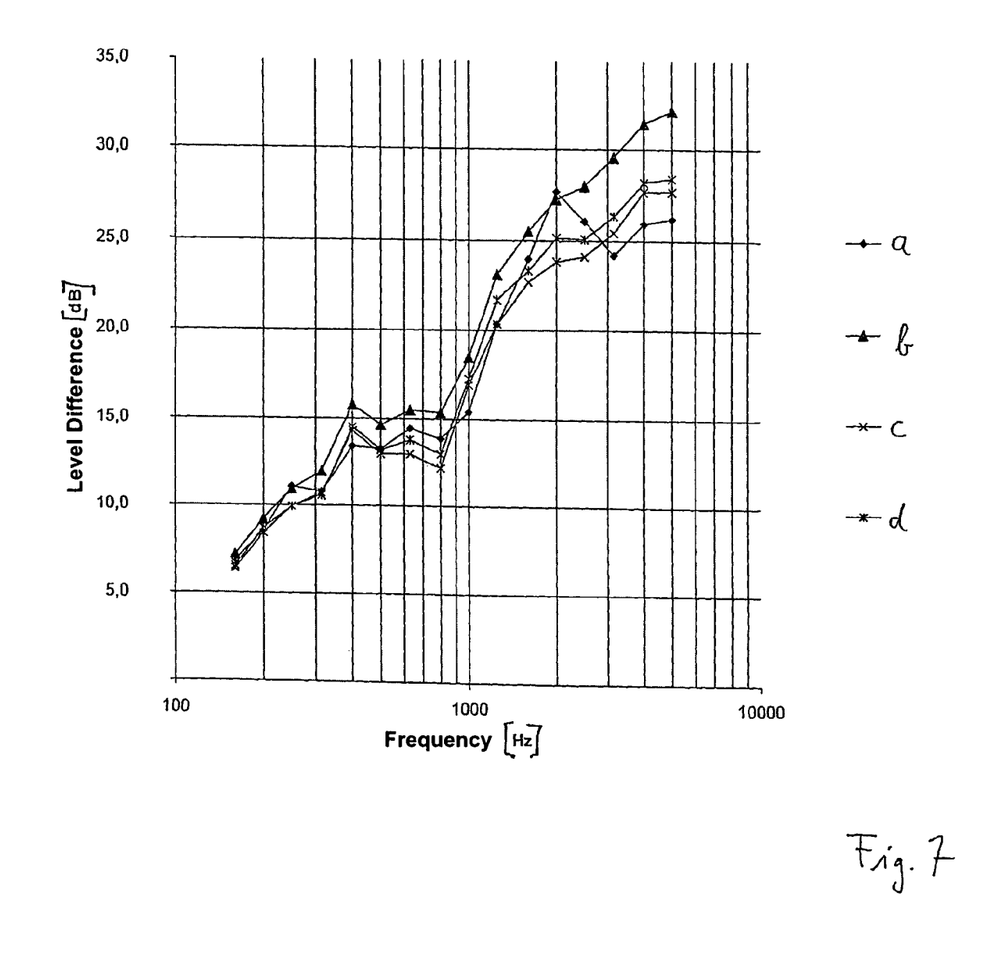
FIG. 7 shows a diagram of an echo chamber measurement, plotting a level difference as a function of a frequency.
Figure 8:
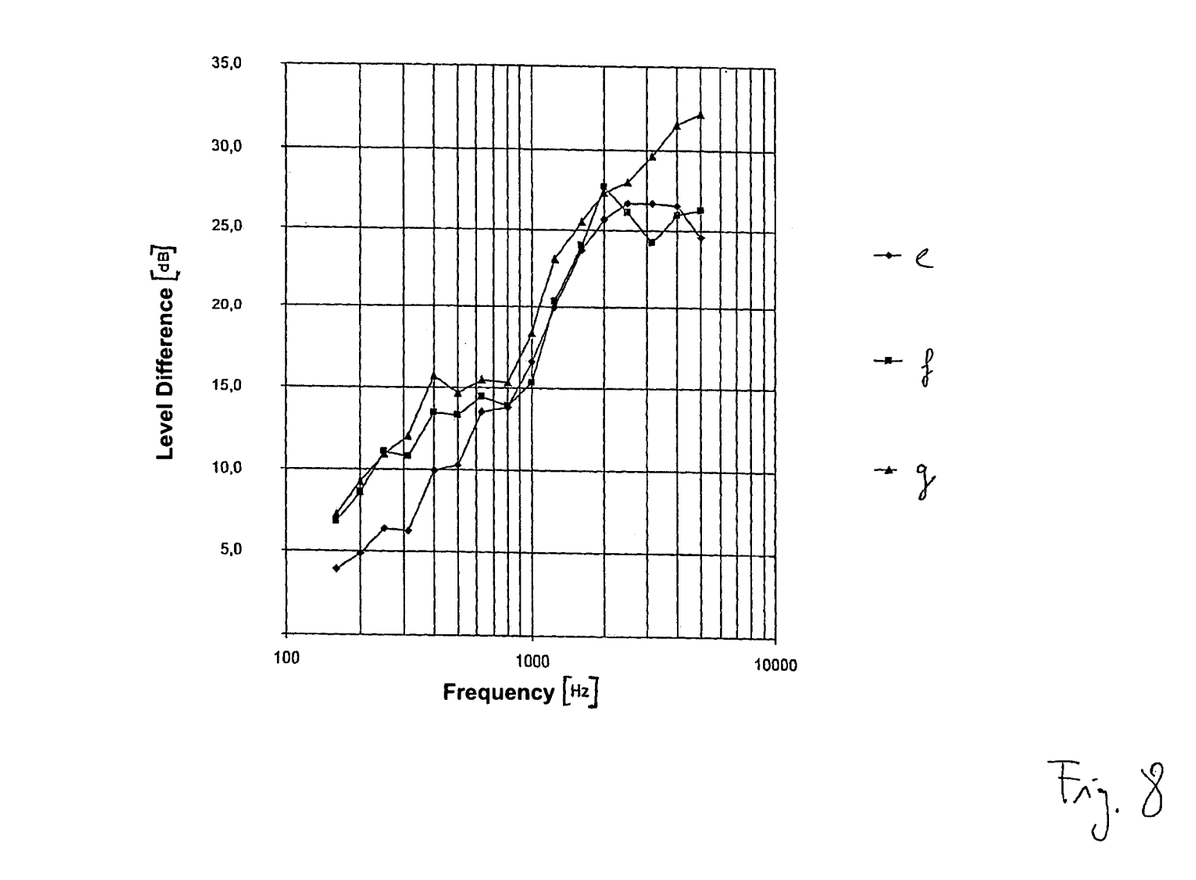
FIG. 8 shows a diagram of an echo chamber measurement, plotting a level difference as a function of the frequency, and FIG. 9 schematically shows an insulation ply foamed onto a supporting layer.

FIGS. 7 and 8 show the results of echo chamber measurements, the two diagrams each showing a level difference as a function of a logarithmically scaled frequency. The echo chamber measurements shown in the FIGS. 7 and 8 were carried out not only for various embodiments of the top material 1 but also for top materials without absorber film. By comparing these measurement results it is possible to deduce information about the improved acoustical insulation provided by the top material 1 including the absorber film according to the invention. In the echo chamber measurements, a sheetlike test specimen is exposed to a sound from one side. Microphones are placed on both sides of the test specimen to record the sound. The placement of the microphones in the measuring chamber is chosen such that the microphone which is placed on that side of the test specimen which is opposite to the source of the sound is sealed off from the source of the sound by the test specimen in a soundproof manner. Thus, the microphone which is on that side of the test specimen which is opposite to the source of the sound will record the sound which has previously passed through the test specimen. Comparing the values measured by the two microphones thus yields a level difference, which is measured in db(A). The level difference is a measure of the extent to which a noise level is deadened or reduced by the test specimen. The frequency of the sound is scaled logarithmically in the range from 150 Hz to 5 kHz in the measurement diagrams.

The following test specimens were investigated in the echo chamber measurements, each identified by letter:
a: a polyurethane foam to which the outer top material 3 is secured on both sides,
b: the top material 1 in an embodiment according to FIG. 4 and FIG. 5 respectively,
c: a polyurethane foam produced on a film backing,
d: the top material 1 in the embodiment according to FIG. 4 and FIG. 5 respectively, wherein the insulation ply 2 is foamed on a film backing instead of on the fabric backing 6,
e: an insulation ply consisting of a needled fibrous non-woven web 25 mm in thickness,
f: the insulation ply 2 to which the outer top material 3 is secured on both sides, and
g: the top material 1 in the embodiment according to FIG. 4 and FIG. 5 respectively.

In test specimens b to d and g, the insulation ply 2 of the top material 1 takes the form of a polyurethane foam 10 mm in thickness.

In test specimens c and d, the film backing mentioned consists of a standard thin film as typically used as a base material for the production of a polyurethane film thereon.

According to the diagrams of FIGS. 7 and 8, the echo chamber measurements were carried out in the frequency range from about 150 Hz to 5 kHz. A driver operating a convertible vehicle will perceive the frequencies from about 800 Hz to about 2 kHz, and this frequency range is therefore particularly relevant. The diagrams as per FIGS. 7 and 8 show that it is particularly in this frequency range that the test specimen in the form of the top material 1 according to the invention gives the best results, i.e., the largest values of level difference. At any rate, test specimens a and e, which do not include an absorber film 5, give smaller level difference measurements, which suggests poorer acoustical insulation.

The inventive top material 1 provides a significant improvement in the acoustical performance of a convertible top, since the large level differences measured suggest that good acoustical insulation can be achieved. Comparative measurements involving a test vehicle where the inventive top material 1 is stretched over a passenger compartment confirm the measurement results in the diagrams as per FIGS. 7 and 8.

The invention claimed is:
1. A convertible top material comprising:
an outer top cloth material being substantially watertight and weathering resistant, so to prevent ingress of water from an outside surface of the outer top material,
an inner roof liner,
an insulation ply disposed between the outer top material and the inner roof liner,
wherein the insulation ply comprises a supporting layer and a foam material, wherein the insulation ply further comprises at least one sound-absorber film, wherein the insulation ply comprises a surface, the sound-absorber film being located on said surface of the insulation ply, said surface of the insulation ply facing one of the outer top cloth material and the inner roof liner, wherein the sound-absorber film provides for an acoustical insulation in a direction perpendicular to the surface.

2. The top material as claimed in claim 1 wherein the sound-absorber film is disposed between the insulation ply and the outer top cloth material.

3. The top material as claimed in claim 1 wherein the sound-absorber film is disposed between the insulation ply and the inner roof liner.

4. The top material as claimed in claim 1 further comprising a second sound-absorber film, wherein the at least one sound-absorber film is disposed between the insulation ply and the outer top cloth material, and wherein the second sound-absorber film is disposed between the insulation ply and the inner roof liner.

5. The top material as claimed in claim 1 wherein the sound-absorber film is secured to the insulation ply by a method selected from the group comprising adhesive bonding, hot pressing and in situ foaming.

6. The top material as claimed in claim 1 wherein the sound-absorber film is made of polyester and nylon.

7. The top material as claimed in claim 1 wherein the sound-absorber film has isotropic properties.

8. The top material as claimed in claim 1 wherein the inner roof liner is disposed adjacent the insulation ply on the vehicle interior side, and wherein an air gap is disposed between the insulation ply and the inner roof liner.

9. A convertible top cover comprising
an outer top material,
a foldable insulation material comprising an insulation ply, the insulation material being disposed adjacent the outer top material, and
an inner roof liner, the inner roof liner being disposed adjacent the insulation material,
wherein an air gap is provided between the insulation material and the inner roof liner,
wherein the insulation material comprises a sound-absorber film having a surface, the sound-absorber film providing for an acoustical insulation in a direction perpendicular to the surface, and
wherein the insulation material comprises a supporting layer.

10. An insulation material for use in a convertible top cover comprising:
a polyurethane foam material,
a first sound-absorber film, the foam material including a first surface, the first sound-absorber film being attached to said first surface of the foam material, wherein the first sound-absorber film provides for an acoustical insulation in a direction perpendicular to the first surface, and
a supporting layer arranged on the foam material,
wherein the insulation material is foldable.

11. The insulation material as claimed in claim 10 wherein the first sound-absorber film is secured to the foam material by a method selected from the group comprising adhesive bonding, hot pressing and in situ foaming.

12. A top cover for use in a convertible vehicle, the top cover being for folding in an opened roof position, the top cover comprising:
an outer top material having an external surface pointing to the outside of the vehicle and an internal surface;
an inner roof liner having an internal surface pointing to the inside of the vehicle and an external surface; and
an insulation ply arranged at a distance between the outer top material and the inner roof liner,
wherein the insulation ply includes at least one externally disposed sound-absorber film for acoustic absorption, and
wherein the at least one sound-absorber film faces one of said internal surface of the foldable outer top material and said external surface of said foldable inner roof liner,
wherein the insulation ply is assembled to define a structural unit.

13. The convertible top material recited in claim 1 wherein the sound-absorber film is bendable so as to allow folding of the convertible top material in an open position.

14. The convertible top material recited in claim 1 wherein the outer top cloth material, the inner roof liner and the insulation ply are configured so as to be foldable together.

15. The convertible top cover recited in claim 9 wherein the outer top material is watertight and weathering resistant, so to prevent ingress of water from an outside surface of the outer top material.

* * * * *